US012419233B2

(12) United States Patent
Zeldes et al.

(10) Patent No.: US 12,419,233 B2
(45) Date of Patent: Sep. 23, 2025

(54) PULSED AEROPONIC AGRICULTURAL GROWTH SYSTEMS AND METHODS

(71) Applicant: BMP MANUFACTURING LLC, Mesa, AZ (US)

(72) Inventors: Mark Jeff Zeldes, Mesa, AZ (US); Albert Carl Meuser, Mesa, AZ (US)

(73) Assignee: BMP Manufacturing LLC, Mesa, AZ (US)

( * ) Notice: Subject to any disclaimer, the term of this patent is extended or adjusted under 35 U.S.C. 154(b) by 0 days.

(21) Appl. No.: 18/736,231

(22) Filed: Jun. 6, 2024

(65) Prior Publication Data
US 2024/0407312 A1 Dec. 12, 2024

Related U.S. Application Data

(63) Continuation-in-part of application No. 16/136,172, filed on Sep. 19, 2018, now abandoned.
(Continued)

(51) Int. Cl.
A01G 31/02 (2006.01)
B05B 9/04 (2006.01)
B05B 12/06 (2006.01)

(52) U.S. Cl.
CPC ............ A01G 31/02 (2013.01); B05B 9/0409 (2013.01); B05B 12/06 (2013.01)

(58) Field of Classification Search
CPC .................................................... A01G 31/02
See application file for complete search history.

(56) References Cited

U.S. PATENT DOCUMENTS 4,163,342 A 8/1979 Fogg et al.
4,332,105 A * 6/1982 Nir .......................... A01G 31/02
239/69

(Continued)

FOREIGN PATENT DOCUMENTS

WO      01/83690 A2      11/2001
WO      2017/024079 A2   2/2017
WO      WO-2017207508 A1 * 12/2017

OTHER PUBLICATIONS

Translation of CN_111771703_A (Year: 2020).*
(Continued)

Primary Examiner — Monica L Perry
Assistant Examiner — Brittany A Lowery
(74) Attorney, Agent, or Firm — Sheppard Mullin Richter & Hampton LLP

(57) ABSTRACT

A system for pulsed aeroponic plant growth without using a media substrate to support plant roots includes a growth platform, a mixing tank, and a hydraulic delivery system, wherein the growth platform is shaped to form multiple apertures, each configured to support a growth ring, and the hydraulic delivery system includes sensors, a high pressure pump, multiple inline valves, and multiple micro-sprayers, the high pressure pump, inline valves, and micro-sprayers being hydraulically coupled to the mixing tank. The mixing tank is configured to combine nutrients in water to generate a nutrient solution for a nutrient solution mist for release through micro-sprayers located in proximity to one or more growth rings, and the hydraulic delivery system is configured to pulse the release of the nutrient solution mist during a feeding cycle at a selected pulse-width.

8 Claims, 8 Drawing Sheets

Related U.S. Application Data

(60) Provisional application No. 62/560,592, filed on Sep. 19, 2017.

(56) References Cited

U.S. PATENT DOCUMENTS

| | | | |
|---|---|---|---|
| 4,669,217 | A | 6/1987 | Fraze |
| 4,992,942 | A | 2/1991 | Bauerle et al. |
| 9,345,207 | B2 | 5/2016 | Juncal et al. |
| 9,807,949 | B2 | 11/2017 | Hamlin |
| 9,872,449 | B2 | 1/2018 | Ross et al. |
| 10,123,491 | B2 | 11/2018 | De Fazio et al. |
| 2005/0011118 | A1 | 1/2005 | Umbaugh |
| 2009/0293357 | A1* | 12/2009 | Vickers ........... A01G 31/02 47/62 A |
| 2014/0144078 | A1 | 5/2014 | Gonyer et al. |
| 2014/0325908 | A1 | 11/2014 | Faris |
| 2015/0040476 | A1 | 2/2015 | Wilson et al. |
| 2015/0129675 | A1 | 5/2015 | Serenelli et al. |
| 2015/0367358 | A1* | 12/2015 | Funseth ........... A01G 25/16 239/562 |
| 2017/0030877 | A1 | 2/2017 | Miresmailli et al. |
| 2017/0094920 | A1 | 4/2017 | Ellins et al. |
| 2017/0223912 | A1 | 8/2017 | Gagne et al. |
| 2017/0265409 | A1 | 9/2017 | Yano et al. |
| 2018/0220603 | A1 | 8/2018 | Burford |
| 2018/0263196 | A1 | 9/2018 | Boucher |
| 2018/0325055 | A1 | 11/2018 | Krakover |
| 2018/0368346 | A1* | 12/2018 | Watson ........... A01G 31/06 |

OTHER PUBLICATIONS

Translation of CN_116806681_A (Year: 2023).*
Poe, Christopher. "The In's and Out's of Metering Pumps." Cole-Parmer, www.coleparmer.com/tech-article/metering-pumps-ins-outs#:-:text=Metering%20pumps%20can%20be%20considered%20a%20subset%20of%20positive%20displacement%20pumps.&text=Metering%20pumps%20have%20an%20average,volume%20wit (Year: 2018).
Non-Final Office Action dated Oct. 7, 2020, issued in related U.S. Appl. No. 16/136,172 (19 pages).
Final Office Action dated May 13, 2021, issued in related U.S. Appl. No. 16/136,172 (23 pages).
Non-Final Office Action dated Jun. 8, 2021, issued in related U.S. Appl. No. 16/136,172 (22 pages).
Non-Final Office Action dated Nov. 12, 2021, issued in related U.S. Appl. No. 16/136,172 (33 pages).
Non-Final Office Action dated Oct. 25, 2022, issued in related U.S. Appl. No. 16/136,172 (19 pages).
Final Office Action dated May 24, 2023, issued in related U.S. Appl. No. 16/136,172 (20 pages).
Non-final Office Action dated Jul. 17, 2024, issued in related U.S. Appl. No. 16/136,172 (18 pages).

* cited by examiner

PULSED AEROPONIC AGRICULTURAL GROWTH SYSTEMS AND METHODS

CROSS-REFERENCE TO RELATED APPLICATIONS

This application is a continuation-in-part of and claims the benefit of U.S. application Ser. No. 16/136,172 filed Sep. 19, 2018, which claimed the benefit of U.S. Provisional Application Ser. No. 62/560,592 filed on Sep. 19, 2017, each of which is hereby incorporated herein by reference in the respective entirety of each.

TECHNICAL FIELD

The disclosed technology relates generally to agriculture, and more particularly to aeroponic agricultural grown systems and methods.

BACKGROUND

Technologies for growing plants outside of a soil-based medium, referred to herein as aeroponics, generally incorporate a non-soil growth substrate to support the plant roots and assist in the delivery of water and nutrients required for plant growth. For example, growth substrates may include rock wool, hydroughton, perlite, vermiculite, clay pellets, sand, gravel, or sawdust. Using these types of growth substrates increases the cost and weight of the hydroponic systems, and decreases efficiency of delivery of water and nutrients to the plant. In particular, growth substrates retain at least some of the moisture and nutrients intended for delivery to the roots. Water may evaporate from the growth substrate, and nutrients may bind to the growth substrate instead of being absorbed into the roots system or otherwise consumed by the plant. As a result, plant growth is attenuated and yield is limited.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1A:
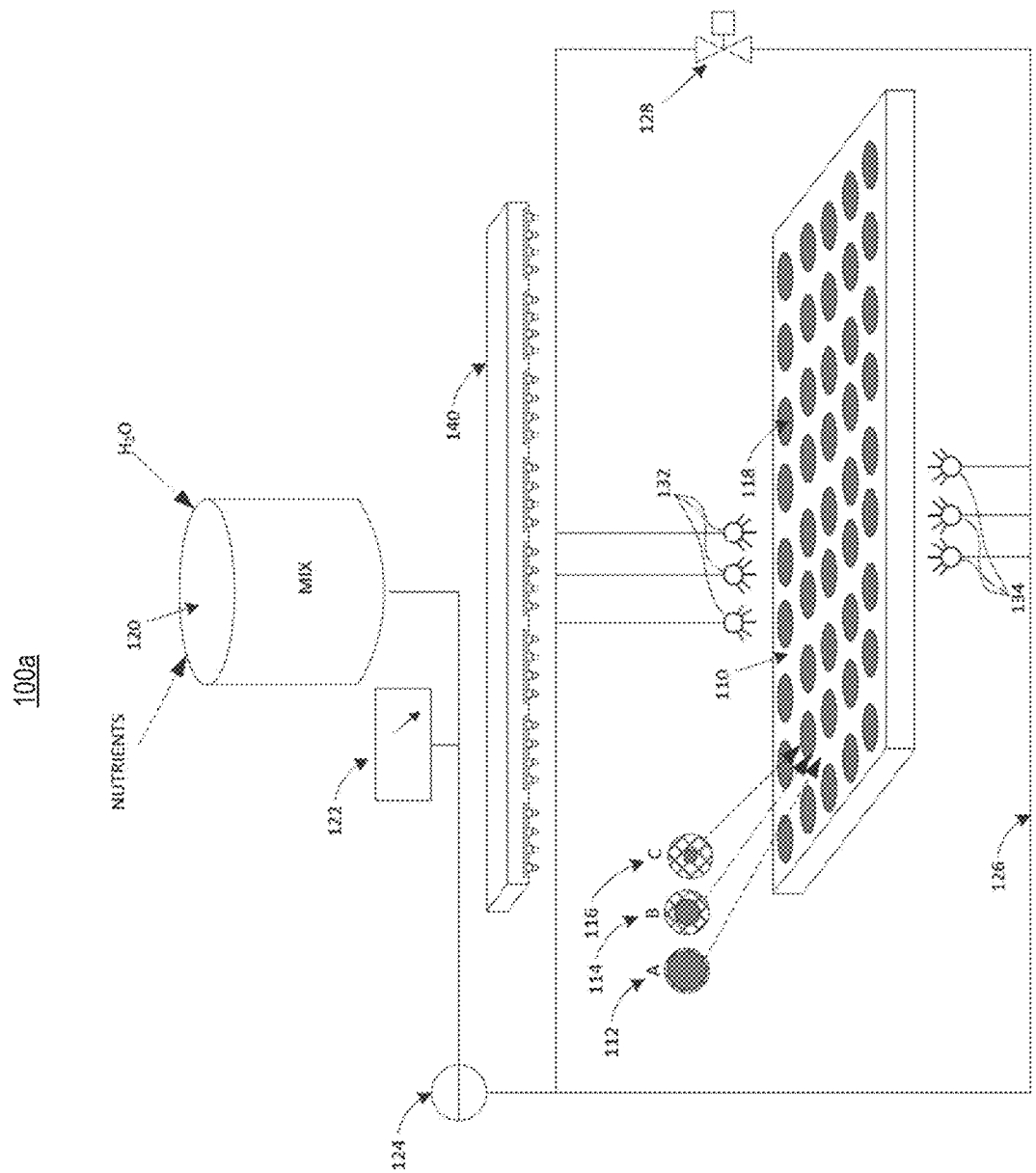
FIG. 1A illustrates a schematic diagram of an example system for pulsed aeroponic plant growth without using a media substrate to support plant roots, consistent with embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Systems and methods for pulsed aeroponic plant growth without a growth substrate are provided. In some embodiments, a system for pulsed aeroponic plant growth without a substrate includes a growth platform configured to support multiple growth frames. A growth frame may include a support structure configured to support a plant with the stem and leaf structure of the plant growing in a first direction and the root structure growing in a second direction. The growth frames may be ring shaped, and may include a cup structure on one side of the ring configured to support or hold in place the root structure of a plant. The cup structure may include multiple apertures to enable water and nutrients to pass through the cup structure and onto the root structure of the plant. The growth frames may be fabricated from plastic, metal, ceramic, composite material, rubber, or other rigid or semi-rigid materials.

The growth platform may be shaped to form multiple apertures shaped to match an outer profile of the growth frames. For example, if the growth frames are ring shaped, then the apertures would be circular and sized with a diameter that is substantially the same as the outer diameter of the growth frame. The apertures may include lip or tab structures with smaller diameters than the outer diameter of the growth frame as to support the growth frames.

A system for pulsed aeroponic plant growth may also include a liquid and nutrient deliver system. For example, the liquid and nutrient deliver system may include a mixing tank, a hydraulic delivery system, a high pressure pump, a controller, an electromagnetic radiation delivery system, and multiple atomizing nozzles. In some examples, the mixing tank is configured to accept water and one or more nutrients (e.g., fertilizer, plant food, pH stabilizers, etc.), and mix the nutrients with the water to generate a nutrient solution. In some examples, the mixing tank is configured to accept water, one or more nutrients, and one or more cleaning agents (e.g., hydrogen peroxide, hypochlorous acid, etc.). The hydraulic delivery system may couple the mixing tank, through the high pressure pump and one or more valves, to the atomizing nozzles. The atomizing nozzles may be positioned to direct a high pressure atomized spray towards one or more plants supported by the growth frames in the growth platform. As used in the present disclosure, high pressure may include pressures greater than 500 pounds per square inch.

In some examples, the hydraulic delivery system includes a series of pipes coupling the mixing tank to the high pressure pump, through multiple inline valves, and to the atomizing nozzles. The atomizing nozzles may be conical and decrease in diameter as to atomize a high pressure liquid into a mist of liquid droplets. In an example, the mist includes 1000 droplets per square millimeter.

In some examples, the hydraulic system may be divided into multiple segments. For example, the system may include an upper segment positioned to deliver a nutrient atomized mist to an upper portion of each plant (e.g., the canopy) located on a first side of the growth frame. The system may also include a lower segment positioned to deliver the nutrient atomized mist to a lower portion of each plant (i.e., the root structure) located on a second side of the growth frame. In some examples, the system may include multiple mixing tanks, one for the upper segment and one for the lower segment. In this example, each segment may comprises a high pressure pump, a controller, and multiple atomizing nozzles. As an example, an upper segment (also referred to as a first hydraulic delivery system) may couple a first mixing tank, through a first high pressure pump and one or more valves, to first atomizing nozzles. The lower segment (also referred to as a second hydraulic delivery system) may couple to a second mixing tank, through a second high pressure pump and one or more valves, to second atomizing nozzles. The first mixing tank may generate and hold a first nutrient solution for the upper portion of each plant (e.g., stomata of each plant), while the second mixing tank may generate an hold a second nutrient solution for the lower portion of each plant (e.g., roots of each plant).

As alluded to above, the nutrient solution generated by the mixing tank, or multiple mixing tanks depending on the implementation, may comprise a cleaning agent mixed the nutrients with the water. In some examples, the cleaning agent may be supplied to the mixing tank as a tablet. The tablet, according to an illustrative example, may be an effervescent tablet comprising hypochlorous acid. The effervescent tablet, once added to water, releases carbon dioxide promoting disintegrating in water, which disperses the hypochlorous acid into the nutrient solution. The hypochlorous acid can be filtered through a filtering system provided along the hydraulic delivery system and sprayed by the atomizing nozzles. The hypochlorous acid contained in the nutrient solution can function as a cleaning agent. The hypochlorous acid can convert back to a solid form after a determined amount of time following release from the tablet and is removed from the system. According to some examples, hypochlorous acid may be used as a cleaning agent for the upper portion of the plant.

In some examples, the nutrient solution for the lower portion of the plant (e.g., the roots of the plant) may comprise hydrogen peroxide at a concentration that is selected to clean and oxygenate the lower portion to promote growth. The concentration of hydrogen peroxide may vary according to plant type. Conventionally, hydrogen peroxide was diluted to prevent root damage, which results in a slower cleaning process and water waste. Examples disclosed herein can avoid root damage through selectively producing droplet sizes of the nutrient solution mist through control of the pressure conditions. Providing a mist having smaller droplet sizes means the droplets have low mass that allows for use of higher concentrations of hydrogen peroxide (e.g., higher strength that reduces overall cleaning time and water waste). In examples, the concentration of hydrogen peroxide can be between 30% and 35% due to the relatively smaller droplet sizes. In an illustrative example, the concentration of hydrogen peroxide can be approximately 32%. Thus, examples herein can prevent root rot, not be diluting hydrogen peroxide, but instead by delivering concentrated hydrogen peroxide via controlled droplet sizes. Similarly, higher concentrations of hypochlorous acid can be used to clean the upper portions of the plant by producing a mist having selectively controlled droplet sizes. Thus, the higher strength cleaning agents can be used that reduce overall cleaning time and water waste.

The inline valves and high pressure pump may be coordinated by the controller. For example, the controller may close the inline valves and enable the high pressure pump subsequent to the nutrients and water being mixed. In this example, the high pressure pumps may be Peristaltic pumps. However, other materials used to compose the high pressure pumps that have a longer run time may be coordinated by the controller. Sensors located in the hydraulic delivery system may monitor the nutrient solution for pressure, temperature, pH, and/or other environmental conditions. The controller may receive an environmental condition signal from one or more of the sensors. The controller may also be configured to open the inline valves closest to the atomizing nozzles when the environmental condition signal indicates that pressure is sufficiently high (e.g., above a threshold pressure). In some examples, the threshold pressure may be greater than 900 pounds per square inch. In other example embodiments, the pressure may be between 50 and 100 pounds per square inch. Yet, in other examples, the pressure may be between 100 and 900 pounds per square inch. In some examples, pressure may be varied between the low, medium, and high pressure ranges by a controller configured to adjust pressure based on pre-programmed timers, user input via a graphical user interface (GUI), and/or input from environmental sensors located in the system. In some examples, the controller may be configured to adjust pressure conditions within the system according to one or more patterns of incremental pressure thresholds (also referred to herein as an incremental pressure algorithm) selected to produce a desired droplet size of the nutrient solution mist. Environmental sensors located in the system may monitor pressure conditions within the system and the controller may adjust the pressure to cause the pressure conditions to incrementally reach each pressure threshold, which may be varied according to one or more sequences.

Control of the pressure conditions within the system to selectively produce a desired droplet size of the nutrient solution mist provides for benefits in providing droplet sizes that can be changed according to plant growth. For example, an immature plant can better absorb larger droplets. As the plant's root mass and canopy grow, the larger droplets may not efficiently penetrate the increasingly larger and denser structures of the plant. Thus, smaller droplets may become more effective in penetration and coverage of the plant surfaces. This applies to both the canopy and the root mass of the plant. Thus, embodiments disclosed herein provide for selective modulation of the particle droplet size for the nutrient and cleaning cycles adapted according to the changes in the plant's physiological properties at each stage of a plant life cycle (e.g., seed, sprout, small plant, and adult plant as known in the art). That is, for example, pressure conditions within the system can be controller to produce droplets having a first size during the seed stage, a second size during the sprout stage, a third size during the small plant stage, and a fourth size during the adult plant stage of a plant life cycle. At least the third size is larger than the fourth size. In some examples, each size is progressively smaller than a size of a preceding stage, such that the first size may be the largest and the fourth size may be the smallest. In some examples, the desired droplet size during the adult plant stage may be approximately 100 um in diameter or less; between approximately 25 um in diameter and approximately 75 um in diameter; between approximately 45 um in diameter and approximately 55 um in diameter.

In some examples, the desired droplet size may selected based on the plant grown in the system. For example, in some implementations, a droplet size of approximately 50 um in diameter has been found, by the inventors of the present disclosure, to be an optimal droplet size for absorption by the plant during the adult plant stage. Accordingly, in an illustrative example, the desired droplet size may be approximately 50 um in diameter.

As used herein, the term "incremental", "increment" and/or variations thereof will be understood to refer a change in a referenced condition or parameter (e.g., pressure in the above example) in any direction (e.g., increase or decrease). Thus, an increment may refer to an increase or decrease (e.g., decrement) in the referenced condition, unless specified otherwise. That is, referring to the above example, "incremental pressure thresholds" may refer to incrementally increasing pressure thresholds and/or incrementally decreasing pressure thresholds (e.g., decremental pressure thresholds).

The controller may cause the inline valves to open and close in a pulsed sequence, such that the nutrient mist is sprayed on the plants in pulses. Each pulse may last for a predetermined time, referred to herein as a pulse-width. For example, the pulse-width may be between 100 milliseconds and 10 seconds. In some examples, the pulse-width may be between 1second and 5 seconds. In some examples, the pulse-width may be randomized or determined according to an algorithm. The algorithm may be used to control and vary pulse rate. For example, the pulse rates may be rapid, e.g., at 1 second or sub-second intervals. In some examples, pulse rates may be moderate, e.g., over several minute or hour intervals. In some examples, pulse rates may be slow, e.g., multi-hour intervals. Pulse rate and pulsation profiles may vary according to the type of high pressure pump. In turn, the algorithm may be used to find optimal pulse rate and pulsation profile for different types of high pressure pumps. In some examples, pulse rates may be varied between the fast, moderate, and slow ranges by a controller configured to adjust pulse rate based on pre-programmed timers, user input via a graphical user interface (GUI), and/or input from environmental sensors located in the system.

The controller may cause the inline valves to enable a predetermined number of pulses for a particular feeding cycle, referred to herein as a cycle width. For example, the cycle width may be between 10 and 100 pulses. In some examples, the nutrient mist may be delivered from only one segment of the hydraulic delivery system for a given cycle. In some examples, the nutrient mist may be delivered from two or more segments of the hydraulic deliver system at the same time (for example, both top and bottom segments at the same time). The controller may cause the inline valves to enact one or more cycles in a day. In some embodiments, the controller may cause the inline valves to enact between eight and twenty-four cycles in a day.

In an illustrative example, the controller may cause the inline valves to open and close and/or operate the high pressure pump in a pulsed sequence to incrementally build up pressure within the system according to the one or more patterns, such that the nutrient solution mist is sprayed on the plants having the desired droplet size. Each pulse may last for an amount of time such that the pressure conditions within the system reach a predetermined pressure threshold. The predetermined pressure threshold may be varied based on current pressure conditions. For example, the incremental pressure thresholds may comprise a plurality of pressure thresholds that are set based on current pressure conditions within the environment, such that the pressure conditions are incremental increased or decreased. In some examples, the one or more patterns may comprises a first pattern of incrementally decreasing pressure thresholds for pulsing the release of the nutrient solution mist in a downward stair step pattern. In this case, the controller may be configured to incrementally decrease pressure conditions from a high pressure condition through one or more medium pressure conditions to a lower pressure condition, for example, by iteratively opening/closing the inline valves and/or operating the high pressure (e.g., iterative pulses of the inline valves and/or high pressure pump) pump to reduce pressure conditions. In some examples, the one or more patterns may also comprises a second pattern of incrementally increasing pressure thresholds in a upward stair step pattern. In this case, the controller may be configured to incrementally increase pressure conditions from the lower pressure condition through another one or more medium pressure conditions to the high pressure condition, for example, by iteratively opening and/or closing the inline valves and/or operating the high pressure pump (e.g., iterative pulses of the inline valves and/or high pressure pump) to increase pressure conditions by spraying nutrient mix into the system. In some examples, the high pressure condition may be 900 pounds per square inch or more, while the lower pressure condition may be less than 900 pounds per square inch. In an example, the lower pressure condition may be 600 pounds per square inch or less. In an illustrative example, the pressure may be adjusted from between 1000 pounds per square inch and 500 pounds per square inch and equal or irregular increments (e.g., changes in pressure). The pressure thresholds that define the one or more patterns may be provided in terms of changes in pressure, which may be selected to produce a nutrient solution mist having a desired droplet sizes. The inline valves and high pressure pump can then be operated in a pulsed sequence to achieve this droplet size.

In the above example, the pulse width of operating the inline valves and/or the high pressure pump may be based on an amount of time for achieving the each incremental pressure threshold. That is, for example, operating the high pressure pump causes atomizing nozzles to spray nutrient mix, thereby increasing pressure in a line between the atomizing nozzles and the high pressure pump. The pulse width of operating the high pressure pump can be based on an amount of time for the added nutrient mix to increase the pressure conditions within the system to a pressure threshold. As such, the pulse width may also be based on the number of atomizing sprays and flow rates effectuated by each atomizing spray. Similarly, the pulse width of operating the inline valves can be based on an amount of time for releasing pressure from the system to a pressure threshold, which can also be based on the number of inline valves involved and flow rates. In some embodiments, a subset of atomizing nozzles and/or inline valves may be operated for fine tuning the pressure with the system with increased precision.

A feeding cycle, in the case of the above examples, may comprise completion of the one or more patterns. For example, a single feeding cycle may have a cycle width defined by incrementing from the high pressure condition to the lower pressure condition and back from the lower pressure condition to the high pressure condition. In some examples, the controller may operate the inline valves and/or high pressure pump according to the pulsed sequence to achieve a predetermined number of feeding cycles within a set time window. In an example, the controller may operate the inline valves and/or high pressure pump so as to perform 1-10 feeding cycles within a 3 minute time window. Referring to the above example for illustrative purposes only, controller may operate the inline valves and/or high pressure pump so as to increment pressure conditions from the high pressure condition to the lower pressure condition and back 1-10 times within the 3 minute time window. Thus, in this example, the cycle width may be between 180 seconds and 18 seconds. However, the present disclosure is not intended to be limited to these examples. Other time windows and cycle widths for a desired application are to be considered as being within the scope of the present disclosure.

In the above example, the droplet size may be relatively small (e.g., approximately 50 um for plants in the adult plant stage according to the above example). When the droplet size of the mist is small, a thin film of nutrients may coat the surface of the roots and/or canopy. The nutrients contained within this thin film can be quickly absorbed by the plant. As a result, it may be beneficial to replace the depleted film with a frequent reapplications, which can be achieved using the example cycles widths described above.

The controller performs the functions of: controlling pulse rates, positioning sensors, adjust temperatures, modifying ambient controls, implementing mixing procedure for nutrient solutions (e.g., the order and amounts of nutrients to add, the amount of time allotted for mixing, etc.), and increasing or decreasing the pH of solutions. These functions performed by the controller allow for pulsed aeroponic plant growth without a growth substrate via automation. Pulse rates, concentration and contents of the nutrient solutions, time of mist delivery, and pH range can vary for different plant types. Additionally, it is essential that the same pulse rates, concentration and contents of the nutrient solutions, time of mist delivery, and pH ranges are used in all instance of growing certain plant type. Manually controlling parameters, such as nutrient mist spraying, may not lead to optimal or even sufficient nutrient feed conditions for certain plants. Pulsed sequences are used to reduce variably while maintaining a sufficient and even optimal nutrient feed conditions.

FIG. 1A illustrates a schematic diagram of an example system for pulsed aeroponic plant growth without a media substrate to support plant roots. For example, a system 100a for pulsed aeroponic plant growth without a media substrate to support plant roots may include a growth platform 110, a mixing tank 120, a nutrient delivery system 126, a high pressure pump 124, multiple atomizing nozzles 132 and 134, and an electromagnetic delivery system 140. Nozzles 132 and/or 134 may be in fluid communication with the high pressure pump 124 via one or more feed lines. In some embodiments, growth platform 110 may include multiple apertures 118 shaped to hold one or more growth frames. For example, the growth frames (e.g., growth frames 112, 114, and 116) may be sized with outer dimensions to securely support the growth frame within an aperture 118, but with varying sizes of inner dimensions shaped to securely support plants of varying corresponding sizes. A smaller inner dimension, C, in growth frame 116 may be used to support younger plants, e.g., seedlings started in a cloner. A larger inner dimension, B, in growth frame 114 may be used to support maturing plants, and a largest inner dimension, A, in growth frame 112 may be used to support adult plants. The growth frames may be interchangeable, and each growth frame may have a similar outer dimension to be supported in approximately the same location in the growth platform 110, i.e., in aperture 118.

In some embodiments, a cloner may include one or more enclosures configured (e.g., a set of cloner enclosures) to encapsulate the growth frames. The set of cloner enclosures may be fabricated from plastic, metal, composite, or other rigid or semi-rigid materials. In some examples, the cloner enclosures may be fabricated using polyethylene or high density polyethylene. The cloner enclosures may include a top surface that is rounded or beveled. In some examples, the top surface may be a dome-shape. The enclosed environment may be sealed or partially sealed to maintain a controlled internal atmospheric condition, e.g., with respect to humidity, pressure, or other environmental conditions. In some examples, the cloner enclosures include a bottom portion to encapsulate the root structure. The bottom portion may be large enough to accommodate a rapid root growth within the cloner. In some examples, the bottom portion may be more than 12 inches deep (i.e., in the dimension extending downward from the surface of the growth frame). In some examples, the top portion and the bottom portion may have the same or similar depth dimensions. The cloner enclosures may be box shaped, cylindrical, or other shapes as known in the art. In some examples, the cloner enclosures may include one or more spring structures configured to apply force to a surface of the enclosure, or a surface disposed within the enclosure, to cause the surface to contact the root structure and accommodate plants that are smaller than the internal capacity of the cloner enclosure.

In some examples, the cloner enclosures may allow for oxygen gas supplementation. For example, in conventional systems solubility of saturated at 0.146%. Whereas, in the embodiments disclosed herein, solubility of the bottom portion of the cloner enclosure that accommodates the roots may not saturate and can reach any desired level. For the upper portion of the cloner enclosure, oxygen gas can be supplemented to maximize photosynthesis. As an illustrative example, the oxygen gas can be supplemented with 1500 ppm of Carbon Dioxide.

In some embodiments, growth platform 110 may also include one or more enclosures (e.g., a set of growth platform enclosures) to encapsulate the growth frames. The growth platform enclosures may be fabricated from plastic, metal, composite, or other rigid or semi-rigid materials. In some examples, the growth platform enclosures may be fabricated using polyethylene or high density polyethylene. The growth platform enclosures may include a top surface that is rounded or beveled. In some examples, the top surface may be a dome-shape. enclosed environment may be sealed or partially sealed to maintain a controlled internal atmospheric condition, e.g., with respect to humidity, pressure, or other environmental conditions. In some examples, the growth platform enclosures include a bottom portion to encapsulate the root structure. The bottom portion may be large enough to accommodate the root structure of mature plants. In some examples, the bottom portion may be about 14 inches deep or more. In some examples, the top portion and the bottom portion may have the same or similar depth dimensions. The growth platform enclosure may be box shaped, cylindrical, or other shapes as known in the art. In some examples, the growth platform enclosures may include one or more spring structures configured to apply force to a surface of the enclosure, or a surface disposed within the enclosure, to cause the surface to contact the root structure. In some examples, the cloner enclosures may include one or more spring structures configured to apply force to a surface of the enclosure, or a surface disposed within the enclosure, to cause the surface to contact the root structure and accommodate plants that are smaller than the internal capacity of the growth platform enclosure.

Still referring to FIG. 1A, system 100a may also include multiple inline valves 128 positioned to allow pressure to build within nutrient delivery system 118 when high pressure pump 124 is enabled. Some inline valves, closest to atomizing nozzles 132 and 134, may be opened and closed in sequence to allow a high pressure mist of nutrient solution to exit the atomizing nozzles and be directed towards plants supported in growth platform 110. Inline valves 128 are able to support pressure buildups between 50 to 100 pounds per square inch. Proportioning valves may also be implemented with the inline valves 128. System 100a may also include one or more environmental sensors 122 configured to monitor environmental conditions within nutrient delivery system 126, including pressure, pH, temperature, or other conditions of interest. In some embodiments, system 100a may also include one or more feeding tanks hydraulically coupled to nutrient delivery system 126 to store the nutrient solution in preparation for delivery through the atomizing nozzles 132 and 134.

In some examples, one or more of the environmental sensors 122 may include a multi-sensor structure. For example, the multi-sensor structure may be a rod structure. The rod structure may include an enclosure fabricated from acrylic, glass, ceramic, or other rigid or semi-rigid materials. The rod multi-sensor structure may include a photoionization detector for detecting gases at the parts per million (PPM) scale, pH sensor, a temperature sensor, an oxygen sensor, or other sensors as known in the art. The enclosure may be fabricated from a translucent material (e.g., clear acrylic, glass, or ceramic) to enable the use of light sensors, e.g., to detect temperature using infrared, or measure other environmental parameters in the water or nutrient solution. For example, the opacity of the solution may be relevant to determining the nutrient composition in real time. By quantifying opacity, spectrophotometric measurements can be made to determine the nutrient composition and even compositions. In some examples, the multi-sensor structure may include an optical sensor, including a light sensor, and digital camera, or other environmental sensors as known in the art.

Electromagnetic delivery system 140 may be one or more light sources. For example, a light source may deliver artificial light in a desired range of wavelengths tuned to enable and enhance photosynthesis in the plants supported in growth platform 110. The light sources may be positioned to direct light towards plant structures supported by growth platform 110.

In some embodiments, a controller may be electronically coupled to one or more of the inline valves 128, the high pressure pump 124, and/or the environmental sensors 122. In other embodiments, the controller may also be electronically coupled to electromagnetic delivery system 140. For example, the logical circuit may include a processor and a non-transitory computer readable medium with computer executable instructions embedded thereon, the computer executable instructions configured to cause the processor to obtain an environmental condition signal from environmental sensor 122.

The computer readable instructions may also be configured to enable high pressure pump 124 to create a high pressure condition within nutrient deliver system 126, and then release nutrient solution through atomizing nozzles 132 and/or 134 by opening and closing inline valves 128 in a desired sequence. In some embodiments, the desired sequence directs a pulsed atomized mist of nutrient solution through atomizing nozzles 132 and 134 towards the plant structures supported by growth platform 110. The controller may also cause the pulsed sequence to cycle at a set or variable interval. In some examples, parameters to control the pulse sequences and cycle times, e.g., pulse-widths and cycle-widths, may be configured from a user interface. The parameters may also include target pressure, pH, temperature, nutrient concentration, cycle width, and/or pulse-width, or other environmental parameters.

Figure 1B:
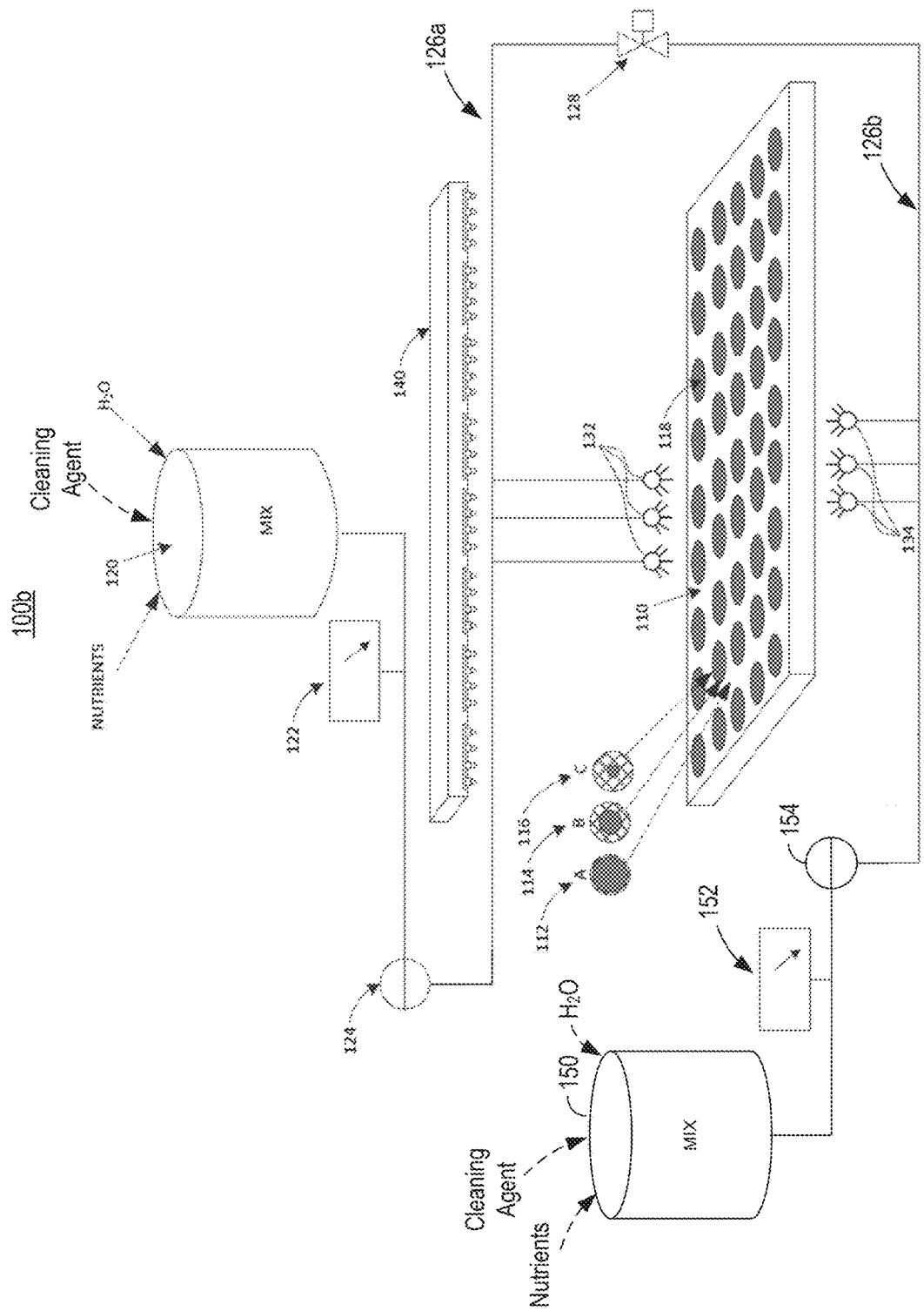
FIG. 1B illustrates a schematic diagram of another example system for pulsed aeroponic plant growth without using a media substrate to support plant roots, consistent with embodiments disclosed herein.
Figure 3:
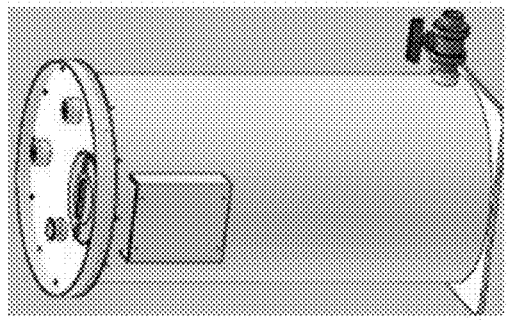
FIG. 3 illustrates a perspective view of a feeding tank, consistent with embodiments disclosed herein.
Figure 2:
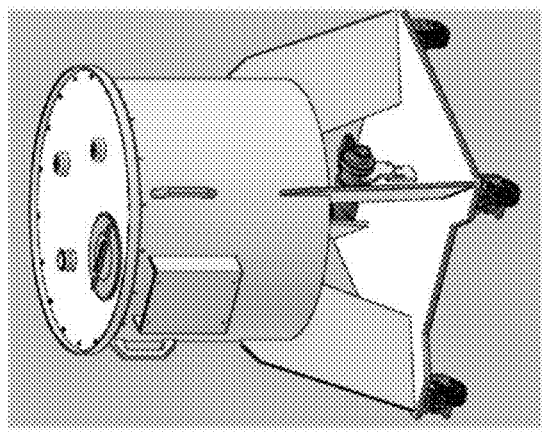
FIG. 2 illustrates a perspective view of a feeding tank, consistent with embodiments disclosed herein.

FIG. 1B illustrates a schematic diagram of another example system for pulsed hydroponic plant growth without a media substrate to support plant roots. For example, a system 100b for pulsed aeroponic plant growth without a media substrate to support plant roots may include the growth platform 110, the mixing tank 120, the high pressure pump 124, the multiple atomizing nozzles 132 and 134, the electromagnetic delivery system 140, inline valves 128, and sensors 122, as described above in connection with FIG. 1A. System 100b also may include a mixing tank 150, sensors 152, and high pressure pump 154. The nutrient delivery system 126 described in connection with FIG. 1A can be divided into nutrient delivery system 126a and nutrient delivery system 126b. Sensors 152 may be substantially similar to the sensors 122. As with system 100a described above, system 100b may also include one or more feeding tanks hydraulically coupled to nutrient delivery systems 126a and 126b to store the nutrient solution in preparation for delivery through the atomizing nozzles 132 and 134, respectively.

System 100b may be conceptually divided into an upper segment and a lower segment.

The upper segment may comprise mixing tank 120, environmental sensor 122, high pressure pump 124, electromagnetic delivery system 140, and atomizing nozzles 132 for delivering nutrient atomized mist to an upper portion of each plant located on a first side of the growth platform 110. In this case, the hydraulic delivery system 126a couples mixing tank 120, through high pressure pump 124 to atomizing nozzles 132. In some embodiments, the upper portion may include one or more feeding tanks hydraulically coupled to nutrient delivery system 126a to store the nutrient solution in preparation for delivery to the upper portion of each plant through the atomizing nozzles 132. The environmental sensors 122 may be configured to monitor environmental conditions within nutrient delivery system 126a, including pressure, pH, temperature, or other conditions of interest.

The lower segment may comprise mixing tank 150, environmental sensor 152, high pressure pump 154, and atomizing nozzles 134 for delivering nutrient atomized mist to a lower portion of each plant located on a second side of the growth platform 110 opposite the first side. In this case, the hydraulic delivery system 126b couples mixing tank 150, through high pressure pump 154 to atomizing nozzles 134. In some embodiments, the lower portion may include one or more feeding tanks hydraulically coupled to nutrient delivery system 126a to store the nutrient solution in preparation for delivery to the upper portion of each plant through the atomizing nozzles 134. The environmental sensors 152 may be configured to monitor environmental conditions within nutrient delivery system 126b, including pressure, pH, temperature, or other conditions of interest.

In some embodiments, a controller may be electronically coupled to one or more of the inline valves 128, the high pressure pump 124, the high pressure pump 154, environmental sensors 152, and/or the environmental sensors 122. In other embodiments, the controller may also be electronically coupled to electromagnetic delivery system 140. For example, the logical circuit may include a processor and a non-transitory computer readable medium with computer executable instructions embedded thereon, the computer executable instructions configured to cause the processor to obtain an environmental condition signal from environmental sensors 122 and/or 152.

Figure 5:
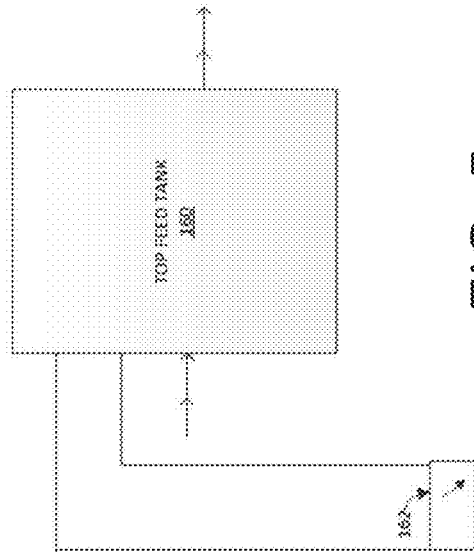
FIG. 5 illustrates a schematic diagram of a feeding tank, consistent with embodiments disclosed herein.
Figure 4:
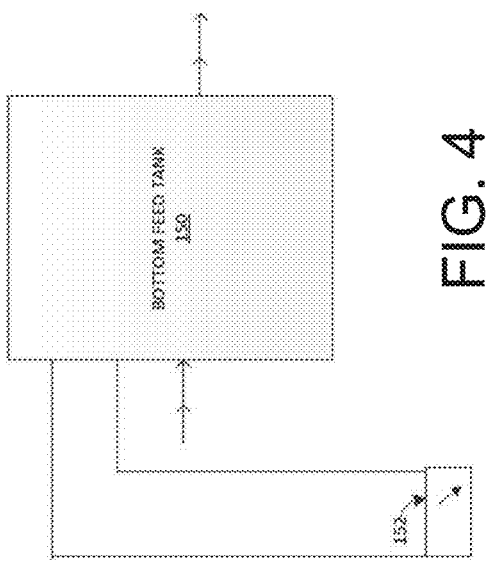
FIG. 4 illustrates a schematic diagram of a feeding tank, consistent with embodiments disclosed herein.

The computer readable instructions may also be configured to enable high pressure pump 124 and/or high pressure pump 154 to create a high pressure condition within nutrient deliver system 126a and/or 126b, respectively, and then release nutrient solution through atomizing nozzles 132 and/or 134 by opening and closing inline valves 128 in a desired sequence. In some embodiments, the desired sequence directs pulsed atomized mist of nutrient solution through atomizing nozzles 132 and 134 towards the plant structures supported by growth platform 110. The controller may also cause the pulsed sequence to cycle at a set or variable interval and/or patterned pressure increments. In some examples, parameters to control the pulse sequences and cycle times, e.g., pulse-widths and cycle-widths, may be configured from a user interface. The parameters may also include target pressure, pH, temperature, nutrient concentration, cycle width, and/or pulse-width, or other environmental parameters.

In some examples, a nutrient solution generated by the mixing tank in the case of system 100*a* or multiple mixing tanks in the case of 100*b* may comprise one or more cleaning agents mixed the nutrients with the water. In some examples, the cleaning agent may be provided supplied to the mixing tank as a tablet. For example, the cleaning agent provided to mixing tank 120 may be an effervescent tablet comprising hypochlorous acid. The effervescent tablet, once added to water, releases carbon dioxide promoting disintegrating in water, which disperses the hypochlorous acid to generate a nutrient solution containing the cleaning agent. The hypochlorous acid can be filtered through a filtering system coupled the hydraulic delivery system 126*a* and sprayed by the atomizing nozzles by operating high pressure pump 124. The hypochlorous acid can convert back to a liquid form after an amount of time determined by the cleaning agent (e.g., 30 minutes in the case of hypochlorous acid) following release from the tablet. This liquid run off can be removed from the system.

In some examples, a cleaning agent for the lower portion of the plant can be mixed in the mixing tank 150. In an illustrative example, the nutrient solution for the lower portion of the plant may comprises hydrogen peroxide at a concentration that is selected to clean and oxygenate the lower portion of the plant and promote growth. The concentration of hydrogen peroxide may be varied according to plant type. The nutrient solution containing the cleaning agent can be pumped through hydraulic delivery system 126*b* and sprayed by the atomizing nozzles 134 by operating high pressure pump 154.

In an example implementation, the upper portions of the plants can be illuminated, via the electromagnetic delivery system 140, during a "lights on" period that is between 18 hours and 24 hours. The "lights on" period can be alternated with a "lights off" period (also referred to as a dark period) of zero to six hours. The combined period of lights on and lights off may be 24 hours. During the "lights on" period, nutrient solution mist can be delivered via nozzles 134 of systems 100*a* or 100*b* to the bottom portion the plant to develop a root system. The nutrient solution mist may be sprayed for about one minute at a rate of four times per hour (e.g., an example feeding cycle) on a continuous and repetitious manner. The application of nutrient solution can maintain hydration for the developing root mass. The period between the application of the nutrient solution mist may be used to supply oxygenation to the developing root mass, but can be short enough to maintain hydration for the developing root mass.

In some examples, during the "lights off" period, system 100*a* or 100*b* can be controlled by the controller to automatically switch to a dark period protocol. The dark period protocol may generate a nutrient solution comprising a cleaning agent that can be applied for first time period (e.g., 30 seconds as an illustrative example) followed by a pure water spray for a second time period (e.g., 60 second as an illustrative example). In examples, the cleaning agent applied to the bottom portion comprises a high concentration hydrogen peroxide mixture, for example, 30-35% hydrogen peroxide. In some examples, the concentration of hydrogen peroxide may be 32%. The dark period protocol can be repeated throughout the "lights off" period at a rate of one minute, four times per hour. The cleaning agent, in this example, may operate to sanitize the bottom portion of the plant and stimulates root hair development. Since photosynthesis cannot take place during the "lights off" period, only water is needed to keep the emerging roots hydrated. The cleaning agent can be applied the beginning of each "light on" period, which can provide for the prevention of the bacterial infection of pythium root rot. Without the examples disclosed herein, a lengthy manual cleaning process may be needed to prevent pythium. Similar protocols may be utilized for the upper portion of the plant. In which case, the cleaning agent may be provided as hypochlorous acid, as described herein.

In some example, during the "lights on" period, carbon dioxide may be injected into the nutrient solution mist applied to the upper portion of the plant (e.g., sprayed by nozzles 132). By increasing the concentration of carbon dioxide applied to the upper portion of the plants, rate of photosynthesis can be increased with can provide for faster plant development. In some examples, oxygen may also be introduced into the nutrient solution mist supplied to the bottom portion of the plant during the "lights on" period to prevent an anerobic condition. Anerobic conditions may favor the development of pythium root rot. As such, the addition of oxygen may be useful to inhibit such occurrences.

FIGS. 2 and 3 illustrate perspective views of example feeding tanks. The feeding tanks may be hydraulically coupled to nutrient delivery system 126. In some embodiments, separate feeding tanks may be hydraulically coupled to different segments of the nutrient delivery system. For example, a first feeding tank may be coupled to a first segment of the nutrient deliver system and a second feeding tank may be coupled to a second segment of the nutrient delivery system. As an example, referring to system 100*a*, a first feeding tank may be coupled to a first segment of nutrient deliver system 126 so to spray from atomizing nozzles 134, while the second feeding tank may be coupled to a second segment of nutrient deliver system 126 so to spray from atomizing nozzles 132. Referring to system 100*b*, first feeding tank may be coupled to nutrient deliver system 126b, while the second feeding tank may be coupled to nutrient deliver system 126a. In some examples, the first segment may be a bottom segment configured to deliver a nutrient mist to a bottom portion of plant structures, for example, as illustrated in FIG. 4. In some examples, the second segment may be a top segment configured to deliver a nutrient mist to a top portion of plant structures, for example, as illustrated in FIG. 5. Each feeding tank may be hydraulically coupled to separate environmental sensors, e.g., 152 and 162, respectively. In some embodiments, the feeding tanks may be connected to a chiller for increased temperature control capabilities.

Figure 6:
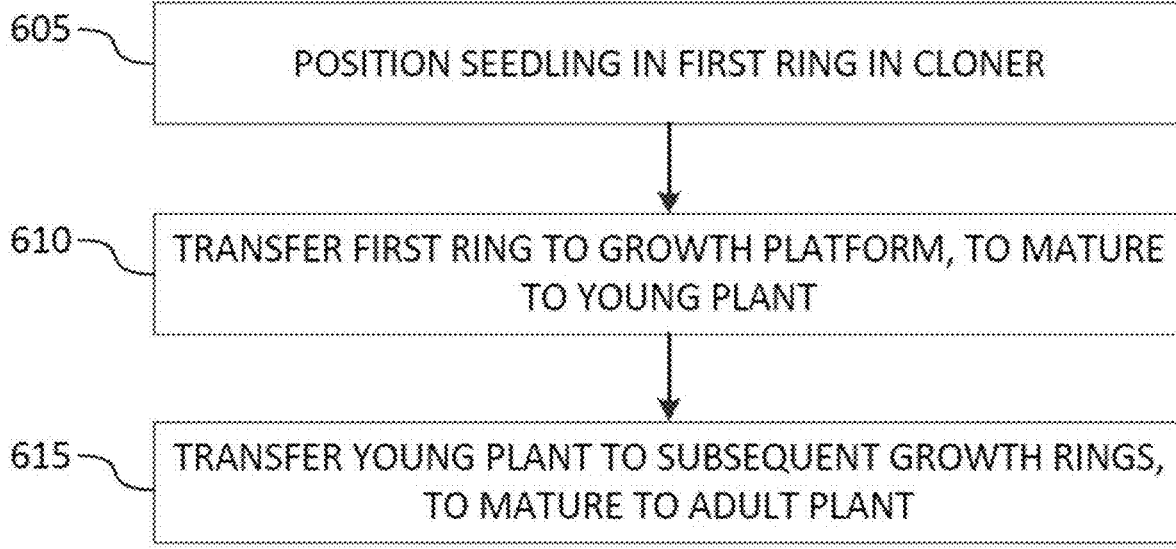
FIG. 6 is a flow chart illustrating an example method for transferring plants to different growth frames to accommodate maturing plants grown in a system for pulsed aeroponic plant growth, consistent with embodiments disclosed herein.

FIG. 6 is a flow chart illustrating an example method for transferring plants to different growth frames to accommodate maturing plants grown in a system for pulsed aeroponic plant growth. As illustrated in FIG. 6, a multi-ring growth process 600 may include positioning a seedling in a first growth ring (e.g., a growth frame) at step 605. In some examples, the first growth ring may be used to transfer the seedling from a cloner to a growth platform at step 610. The maturing plant may be transferred to subsequent growth rings (e.g., growth frames) at step 615. Step 615 may be iterated multiple times as the plant grows, and requires growth rings with larger inner diameters to support the maturing plant structure.

Figure 7:
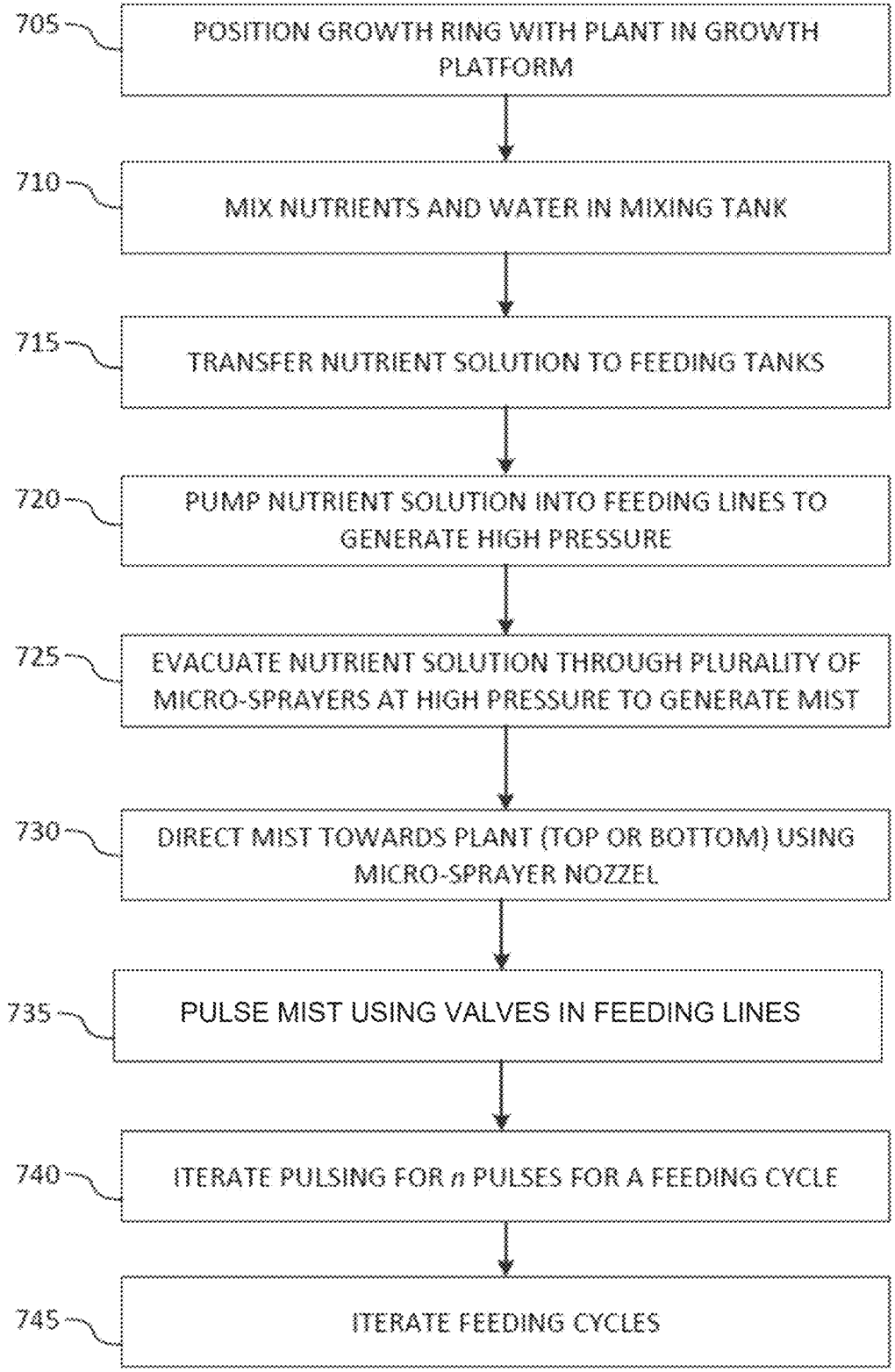
FIG. 7 is a flow chart illustrating a method for pulsed aeroponic plant growth without a media substrate to support plant roots, consistent with embodiments disclosed herein.

FIG. 7 is a flow chart illustrating a method for pulsed aeroponic plant growth without a media substrate to support plant roots. As illustrated in FIG. 7, a method for high pressure pulsed growing of agricultural products 700 may include positioning multiple growth rings in a growth platform at step 700. A plant may be disposed within a growth ring. The growth rings may support varying plant sizes and maturity levels as described herein with respect to FIG. 6. In illustrative examples, the method of FIG. 7 may be implemented using system 100a and/or 100b as described above.

In some embodiments, method 700 may include mixing nutrients and water in a mixing tank at step 710. For example, nutrients may include fertilizer, plant food, pH adjusters or stabilizers, macro nutrients, micro nutrients, or other plant growing supplements as known in the art. The mixing may occur in advance of a feeding cycle. In some examples, the mixing may be a "just-in-time" process such that nutrients are kept separate from water until just before the time they will be delivered in a nutrient solution to the plants. This "just-in-time" type of mixing may lead to concentration gradients which can more effectively feed the plant upon delivery to the plants.

In some examples, step 710 may also include mixing one or more cleaning agents with the nutrients and water in a mixing tank. For example, cleaning agents may include hypochlorous acid, hydrogen peroxide, or other plant cleaning agents as known in the art. The cleaning agents may be added as a solid or liquid and mixed with other contents of the mixing tank. In an illustrative example, the cleaning agents may be provide as an effervescent tablet that, once added to the mixing tank, releases carbon dioxide promoting disintegrating in water, which disperses the cleaning into the nutrient solution.

In some examples, separate mixing tanks may be used to store nutrient solution intended for different segments of a nutrient delivery system. For example, a first mixing tank for mixing a nutrient solution destined for a top portion of the plants and second mixing tank for mixing a nutrient solution destined for bottom portion of the plants. In this example, the cleaning agent provided to the first mixing tank may be different than the cleaning agent provided to the second mixing tank.

Still referring to FIG. 7, method 700 may also include transferring the nutrient solution to one or more feeding tanks at step 715. Feeding tanks may store nutrient solution prior to delivery to the plants. In some examples, separate feeding tanks may be used to store nutrient solution intended for different segments of a nutrient delivery system (e.g., a segment for delivering nutrient solution to a top portion of the plants and a segment for delivering nutrient solution to a bottom portion of the plants). Separate feeding tanks may also be used to store nutrient solution intended for different feeding cycles. In some examples, different mixes of nutrient solution may be used in different feeding tanks to optimize the nutrient component ratio, proportions of nutrient components, or types of nutrient components for particular plant types, plant ages, or times of day. In some examples, the nutrient solution composition may be adjusted based on data obtained from environmental sensors monitoring conditions of the nutrient solution.

In some embodiments, method 700 may also include pumping the nutrient solution into feeding lines (e.g., portions of a nutrient delivery system between a high pressure pump and nozzles) to generate high pressure inside the feeding lines at step 720. The nutrient solution may then be evacuated from the feeding lines through a plurality of micro-sprayers (e.g., atomization nozzles) at high pressure to generate a mist at step 725. For example, the nutrient solution may be selectively released through different micro-sprayers using inline valves disposed within the feeding lines. By creating a high pressure condition within the feedlines (e.g., more than 500pounds per square inch, and in some examples, more than 900 pounds per square inch), the nutrient solution may be atomized through the distal ends of the micro-sprayers to create a nutrient solution mist with droplet sizes of less than 10 um in diameter. The nutrient solution mist may be directed towards plant structures (e.g., root systems or stem systems) at step 730, for example, by positioning the micro-sprayer nozzles.

In some examples, the nutrient solution mist may be pulsed at step 735, for example, by opening and closing the inline valves that control release of nutrient solution through the micro-sprayers. The pulsing may also be controlled by alternating segments of the nutrient delivery system to which nutrient solution is directed using an articulating diverter, or using other pulsing methods as known in the art. The pulse-width may be consistent with the pulse-width described herein with respect to FIGS. 1A and/or 1B. The pulsing may be iterated multiple times in a feeding cycle at step 740 and the feeding cycles may be iterated according to a desired schedule at step 745, consistent with cycle widths described herein with respect to FIGS. 1A and/or 1B. In an example, by pulsing the nutrient solution mist at high pressure (e.g., between 50 to 100 pounds per square inch) towards plant structures for predetermined time, and cycling the feeding cycles, the plant root systems and other plant structures may be kept fed and hydrated, without overfeeding or overhydrating, in the absence of a substrate medium.

In some examples, nutrient solution mist may be pulsed at step 735 for a number of pulses n at step 740 according to one or more patterns of pressure thresholds selected to incrementally increase or decrease the pressure conditions and obtain a desired droplet size of the nutrient solution mist. One or more patterns may comprise a set of pressure thresholds as a function of pressure conditions within the system as measured by environmental sensors. For example, the one or more patterns may comprise incremental pressure thresholds that set a set a high pressure condition, a lower pressure condition, and one or more medium pressure conditions therebetween.

In examples, the environmental sensors may detect pressure within the system for monitoring current pressure conditions and step 735 may include operating the inline valves and/or high pressure pump to according to the pressure thresholds. As an illustrative example, the one or more patterns may comprise a first pattern of incrementally decreasing pressure thresholds and a second pattern of incrementally increasing pressure thresholds. In this case, step 735 may include operating the inline valves and/or high pressure pump to release pressure and decrease the pressure conditions from the high pressure condition until the pressure conditions within the system (e.g., within the feeding lines), as detected by the environmental sensors, reach a first incrementally decreasing pressure threshold. The first incrementally decreasing pressure threshold may correspond to one of the one or more medium pressure conditions. This release to a first pressure threshold may constitute a pulse at step 735.

Step 740 may include iterating step 735 for each pressure threshold to incrementally release pressure until monitored pressure conditions reach each of the incrementally decreasing pressure thresholds. For example, step 740 may include repeating step 735 for each subsequent incrementally decreasing pressure threshold until the current pressure conditions reach the last incrementally decreasing pressure threshold (e.g., lower pressure condition).

Upon reaching the last incrementally decreasing pressure threshold, step 740 may then repeat the process for the second pattern of incrementally increasing pressure thresholds. That is, for example, step 735 may be iteratively executed to increase the pressure within the system back to the high pressure condition by incrementing through each incrementally increasing pressure threshold. Once the pressure conditions, as monitored by the environmental sensors, reach the last incrementally increasing pressure thresholds (e.g., returns to the high pressure condition), step 740 may be complete, thereby constituting a single feeding cycle in this example.

Step 745 may comprise iterating the feeding cycle (e.g., steps 740 and 735 for a second feeding cycle) according to a desired schedule. The pulse-width of each instance of step 735 may correspond to an amount of time to cause the pressure conditions, as monitored by the environmental sensors, to reach a respective pressure threshold of the one or more patterns. The cycle width of feeding cycle may be based on the total time for taking the pressure in the system from the high pressure condition to the low pressure condition and back to the high pressure condition.

The one or more patterns executed through steps 735 and 745 may be selected to produce a nutrient solution mist having a desired droplet size for a given stage of the plant's growth cycle (e.g., seed, sprout, small plant, and/or large plant stages). For example, the desired droplet size during the adult plant stage may be approximately 100 um in diameter or less; between approximately 25 um in diameter and approximately 75 um in diameter; between approximately 45 um in diameter and approximately 55 um in diameter. In some implementations, a droplet size of approximately 50 um in diameter may be optimal for absorption by the plant during the adult plant stage. The one or more patterns executed through steps 735 and 745 may be selected according to the plant's growth stage so to produce a nutrient solution mist having droplet size that is optimal for a particular growth stage of the plant.

Figure 8:
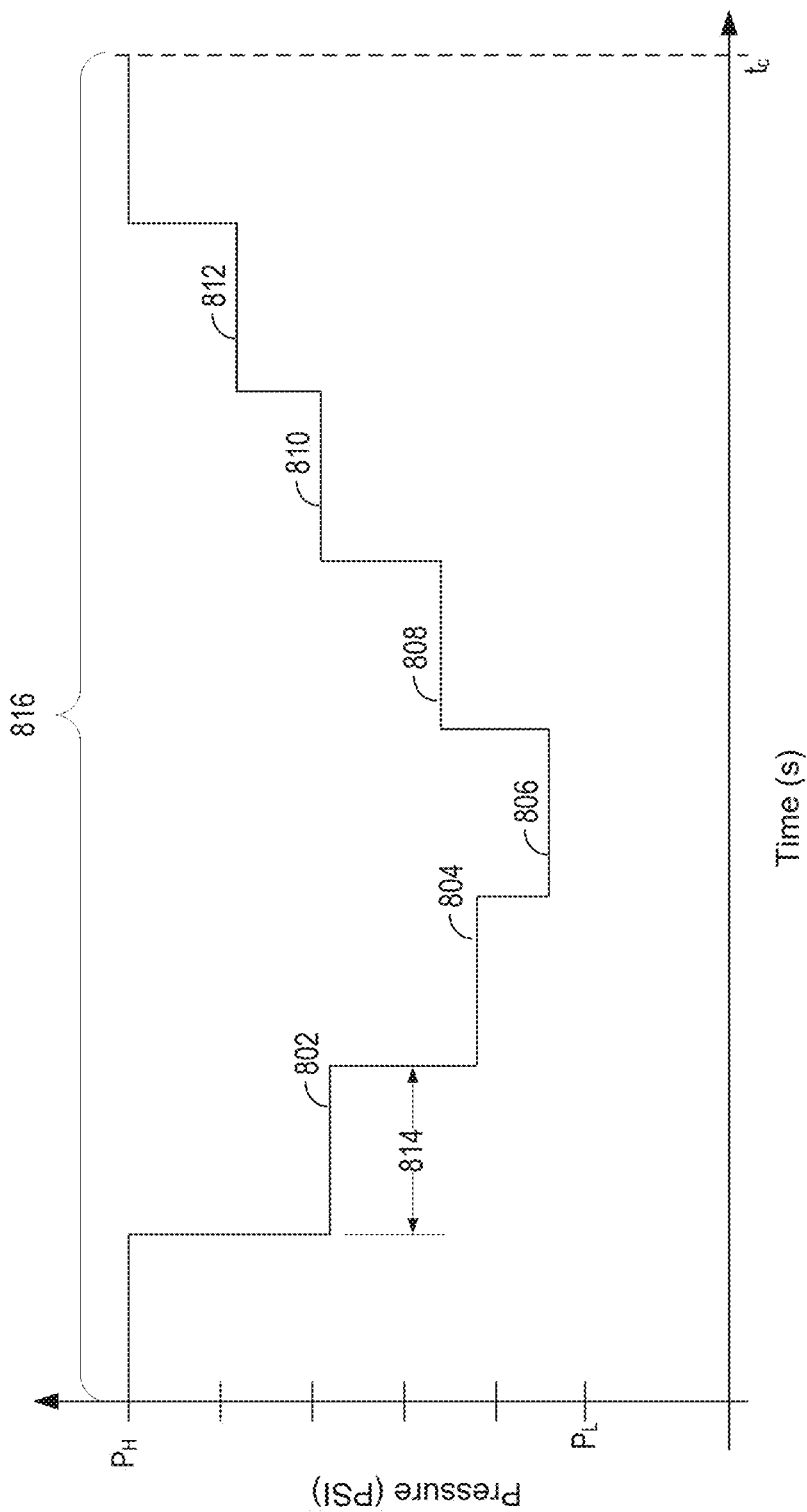
FIG. 8 illustrates a graphical representation of a pulsed aeroponic plant growth, consistent with an embodiment disclosed herein.
Figure 9A:
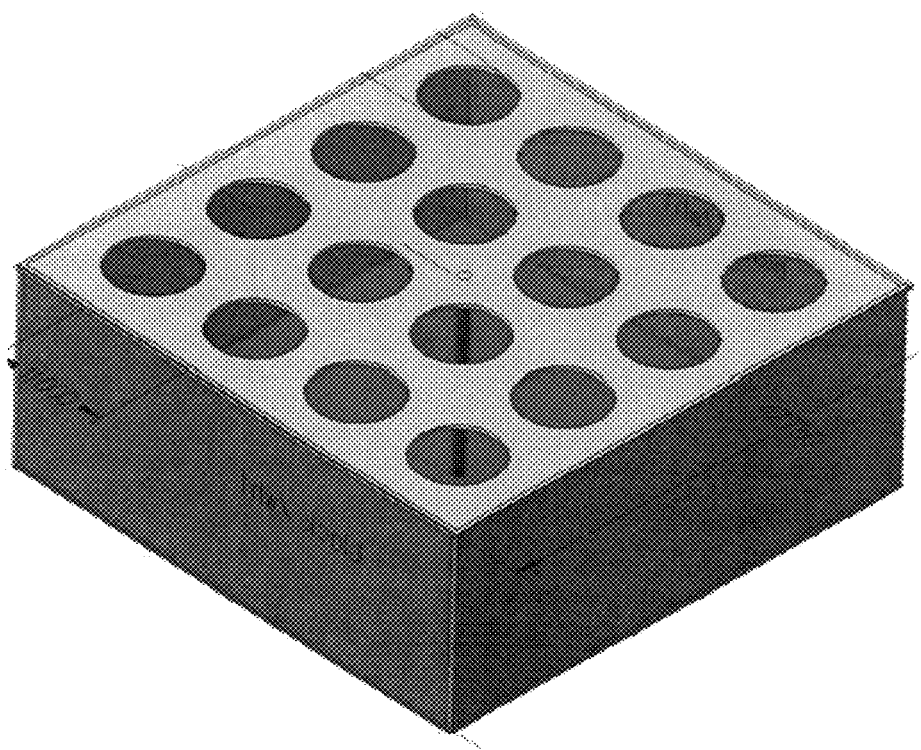
FIG. 9A is a perspective view of a growth platform, consistent with embodiments disclosed herein.
Figure 9B:
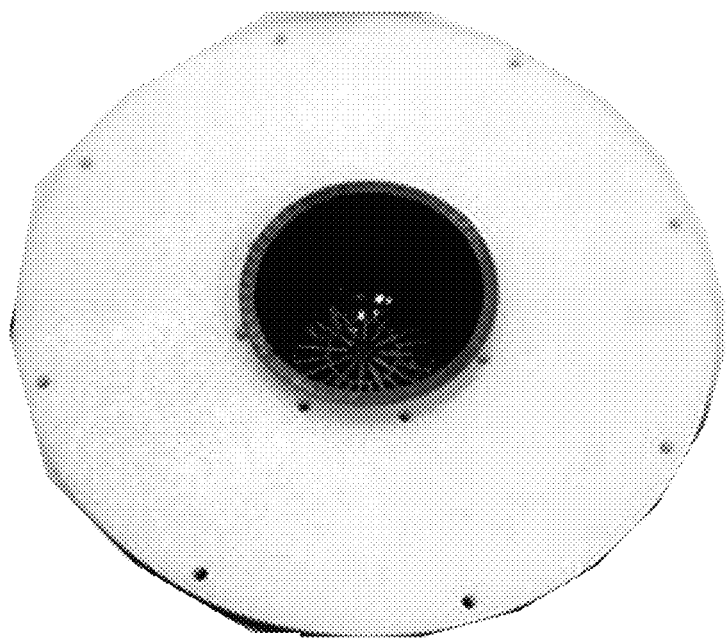
FIG. 9B is a perspective view of a growth frame, consistent with embodiments disclosed herein.

The pressure thresholds and time for achieving satisfying the pressure thresholds may be set so to achieve the desired droplet size. In an illustrative example, the one or more patterns may comprise a high pressure condition set at 1000 pounds per square inch and a lower pressure condition set at 500 points per square inch. In an example, the one or more patterns may comprise three thresholds between the high and low pressure conditions that provide for three incrementally smaller medium pressure conditions. The one or more patterns may also comprise three pressure thresholds between the lower and high pressure conditions that provide for three incrementally greater medium pressure conditions. In some examples, the change in pressure between each pressure threshold may be based on the prior pressure condition, such that differences between pressures thresholds at lower pressure conditions are smaller than differences between pressures thresholds at higher pressure conditions (as shown in the example of FIG. 8). In another example, the changes between pressure thresholds may be approximately equal providing a consistent change in pressure between each pulse (e.g., 200 pounds per square inch in one example).

As alluded to above, FIG. 8 illustrates a graphical representation of one or more patterns for pulsing the nutrient solution mist, consistent with one embodiment. FIG. 8 depicts a stair step pattern comprising a first pattern of incrementally decreasing pressure conditions and a second pattern of incrementally increasing pressure conditions for pulsing the spray of nutrient solution mist, for example, by system 100*a* and/or 100*b*. In the example of FIG. 8, the first pattern comprises a high pressure condition ($P_H$) and incremental pressure thresholds 802-806 with an increasingly smaller difference therebetween. In this example, pressure threshold 606 is greater than a lower pressure condition ($P_L$), but is close enough that any substantive change in pressure would take the system below $P_L$. FIG. 8 also depicts the second pattern comprising incremental pressure thresholds 808-812, with increasing larger differences therebetween, until the pressure within the system returns to $P_H$. In an illustrative example, the pressure within the system can be incrementally decreased from 1000 pounds per square inch to 780 pounds per square inch (e.g., pressure threshold 802), to 620 pounds per square inch (e.g., pressure threshold 804), and to 540 pounds per square inch (e.g., pressure threshold 806). Then from 540 pounds per square inch to 660 pounds per square inch (e.g., pressure threshold 808), to 790 pounds per square inch (e.g., pressure threshold 810), to 840 pounds per square inch (e.g., pressure threshold 812), and back to 1000 pounds per square inch.

Each pulse for achieving thresholds 802-712 has a corresponding pulse-width. For example, pulse-width 814 represents the pulse at which inline valves and/or high pressure pump are operated by a controller to achieve the pressure conditions of threshold 802, for example, within feeding lines. While only pulse-width 814 is shown in FIG. 8, each pulse will be understood as having a corresponding pulse-width. A complete feeding cycle 816 may comprise the pressure changes from $P_H$ to $P_L$ having a cycle width of $t_c$. In an illustrative example, the cycle width may be between 180 second and 18 seconds, which provides for 1 to 10 cycles for each 3 minute time window.

While FIG. 8 depicts a particular example with certain pressures, embodiments disclosed herein are not intended to be limited to this particular example. FIG. 8 provides just one implementation that can be used for pulsing the nutrient solution mist to achieve a desired droplet size of approximately 50 um in diameters. However, other patterns and droplet sizes may be achieved. For example, the pattern may comprise more or fewer incremental steps and/or different upper and lower pressure conditions. In some examples, the pressure change between each step may be equal providing consistent pressure changes (e.g., incrementing up or down by 200 pound per square inch for each pulse), opposed to the varied pressure changes shown in FIG. 8. In another example, the pulse-widths may be equal in terms of time or varied dependent upon the time for achieving the pressure conditions.

Accordingly, growing efficiency is increased while minimizing hydraulic and nutrient waste. Maintaining a desired pH balance, environmental conditions, and nutrient composition, the nutrient solution may be evacuated through the micro-sprayer nozzles at an optimal rate without experiencing nutrient lock-up, e.g., a condition where nutrients may precipitate out of solution or suspension and deposit on internal components of the nutrient delivery system, and reduce the performance of the nutrient delivery system. Additionally, controlled droplet size provides for optimal absorption by the plant, which can further increase growing efficiency.

Figure 10:
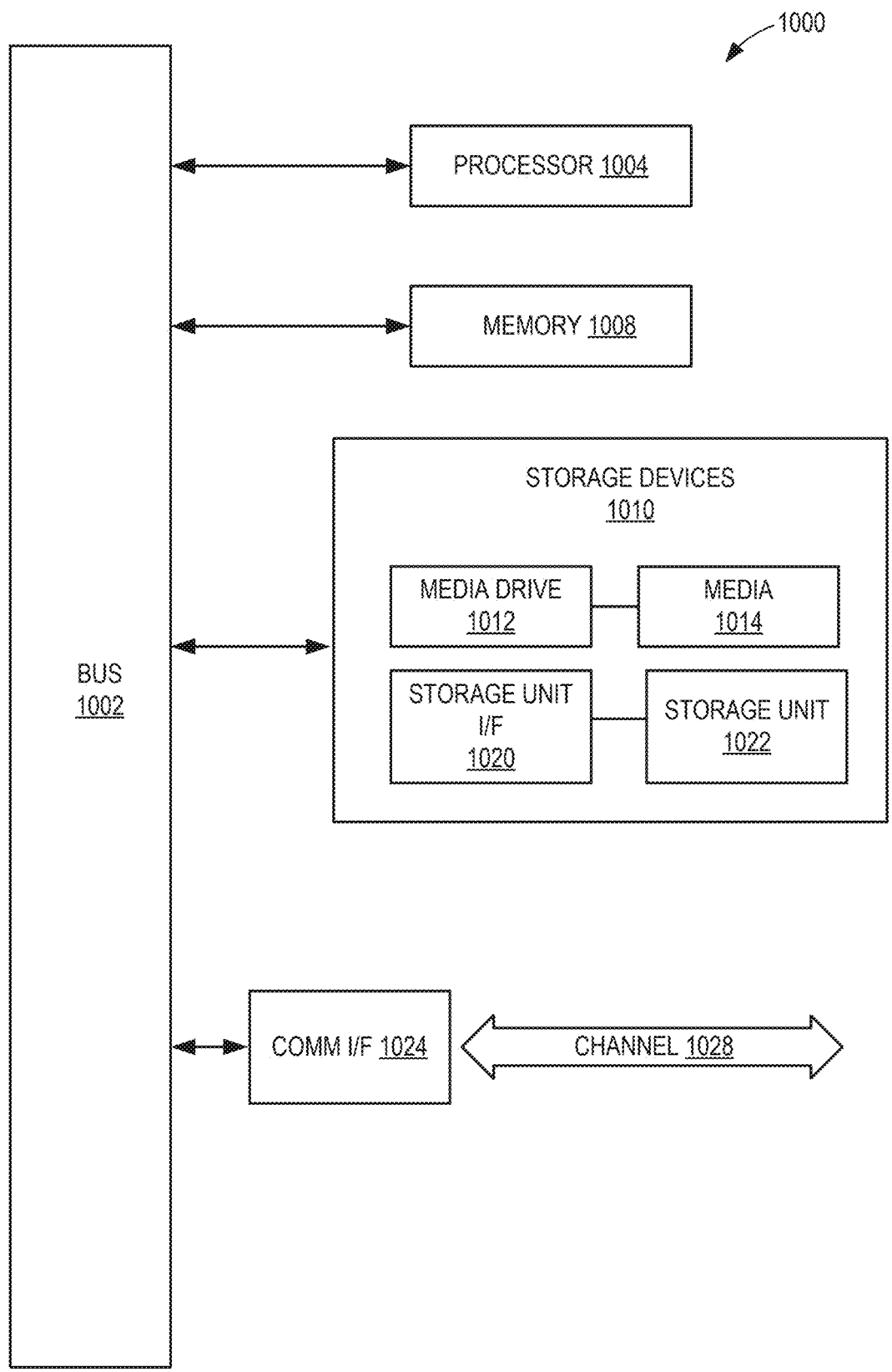
FIG. 10 illustrates an example computing system that may be used in implementing various features of embodiments of the disclosed technology.

As used herein, the term engine or logical circuit might describe a given unit of functionality that can be performed in accordance with one or more embodiments of the technology disclosed herein. For example, the controller described herein may be implemented using an engine or a logical circuit. As used herein, an engine or logical circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up an engine. In implementation, the various engines described herein might be implemented as discrete engines or the functions and features described can be shared in part or in total among one or more engines. In other words, as would be apparent to one of ordinary skill in the art after reading this description, the various features and functionality described herein may be implemented in any given application and can be implemented in one or more separate or shared engines in various combinations and permutations. Even though various features or elements of functionality may be individually described or claimed as separate engines, one of ordinary skill in the art will understand that these features and functionality can be shared among one or more common software and hardware elements, and such description shall not require or imply that separate hardware or software components are used to implement such features or functionality.

Where components or engines of the technology are implemented in whole or in part using software, in one embodiment, these software elements can be implemented to operate with a computing or processing engine or logical circuit capable of carrying out the functionality described with respect thereto. One such example computing engine or logical circuit is shown in FIG. 10. Various embodiments are described in terms of this example computing engine or logical circuit 1000. After reading this description, it will become apparent to a person skilled in the relevant art how to implement the technology using other computing engines, logical circuits, or architectures. In examples, computing engine or logical circuit 1000 may be implemented as a controller of system 100*a* and/or 100*b*.

Referring now to FIG. 10, computing system 1000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing engine or logical circuit 1000 might also represent computing capabilities embedded within or otherwise available to a given device. For example, a computing engine or logical circuit might be found in other electronic devices such as, for example, digital cameras, navigation systems, cellular telephones, portable computing devices, modems, routers, WAPs, terminals and other electronic devices that might include some form of processing capability.

Computing system 1000 might include, for example, one or more processors, controllers, control engines, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing engine or logical circuit 1000 or to communicate externally.

Computing system 1000 might also include one or more memory engines, simply referred to herein as main memory 1008. For example, preferably random access memory (RAM) or other dynamic memory, might be used for storing information and instructions to be executed by processor 1004, such as the operations described in connection with methods 600 and/or 700. Main memory 1008 might also be used for storing temporary variables or other intermediate information during execution of instructions to be executed by processor 1004. Computing engine or logical circuit 1000 might likewise include a read only memory ("ROM") or other static storage device coupled to bus 1002 for storing static information and instructions for processor 1004.

The computing system 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing engine or logical circuit 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory engine) and memory slot, a PCMCIA slot and card, and other fixed or removable storage units 1022 and interfaces 1020 that allow software and data to be transferred from the storage unit 1022 to computing engine or logical circuit 1000.

Computing engine or logical circuit 1000 might also include a communications interface 1024. Communications interface 1024 might be used to allow software and data to be transferred between computing engine or logical circuit 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing engine or logical circuit 1000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for pulsed aeroponic plant growth without using a media substrate to support plant roots comprises:
   a growth platform having an elevated planar surface and configured to support multiple growth frames, wherein stem and leaf portions of plants extend above the elevated planar surface and root portions of plants extend below the elevated planar surface when the plants are disposed within the growth frames;
   one or more mixing tanks configured to combine nutrients in water to generate one or more nutrient solutions;
   a hydraulic delivery system configured to release a mist of the one or more nutrient solutions, the hydraulic delivery system comprising:
     sensors hydraulically coupled to the one or more mixing tank;
     a high pressure pump hydraulically coupled to the one or more mixing tank;
     multiple flow control valves downstream of the high pressure pump; and micro-sprayers hydraulically coupled to the one or more mixing tank and positioned to direct the mist of the one or more nutrient solutions towards the plants disposed within the growth frames, wherein the hydraulic delivery system is configured to pulse a release of the mist of the one or more nutrient solutions during a feeding cycle according to one or more patterns of incremental pressure thresholds that are based on a desired droplet size of the mist of the one or more nutrient solutions; and a processor configured to execute instructions to:
receive pressure conditions from the sensors;
set a high pressure threshold at 1000 pounds per square inch and a lower pressure threshold at 500 pounds per square inch;
control the pulses of the release of the mist of the one or more nutrient solutions to decrease the pressure conditions within the hydraulic delivery system from the high pressure threshold to the low pressure threshold, wherein each decrease lowers the pressure conditions by 200 pounds per square inch; and
control the pulses of the release of the mist of the one or more nutrient solutions to increase the pressure conditions within the hydraulic delivery system from the low pressure threshold to the high pressure threshold, wherein each increase raises the pressure conditions by 200 pounds per square inch.

2. The system of claim 1, wherein the desired droplet size is between 45 um and 55 um.

3. The system of claim 1, wherein a first set of micro-sprayers is positioned below the elevated planar surface and is configured to release the mist of the one or more nutrient solutions at high pressure toward the root portions of the plants.

4. The system of claim 3, wherein a second set of micro-sprayers is positioned above the elevated planar surface and is configured to release the mist of the one or more nutrient solutions at high pressure toward the stem and leaf portions of the plants.

5. The system of claim 4,
wherein the one or more mixing tanks comprise a first mixing tank and a second mixing tank, the first mixing tank configured to combine the nutrients in water to generate a first nutrient solution and the second mixing tank configured to combine the nutrients and a cleaning agent in water to generate a second nutrient solution,
wherein the first set of micro-sprayers are hydraulically coupled to the first mixing tank and configured to release a mist of the first nutrient solution at high pressure toward the root portion of the plants,
wherein the second set of micro-sprayers are hydraulically coupled to the second mixing tank and configured to release a mist of the second nutrient solution at high pressure toward the stem and leaf portion of the plants,
wherein the cleaning agent comprises hypochlorous acid that is received by the second mixing tank as an effervescent tablet.

6. The system of claim 1, wherein the sensors comprise one or more pressure sensors.

7. A system for pulsed aeroponic plant growth without using a media substrate to support plant roots comprises:
a growth platform having an elevated planar surface and configured to support multiple growth frames, wherein stem and leaf portions of plants extend above the elevated planar surface and root portions of plants extend below the elevated planar surface when the plants are disposed within the growth frames;
one or more mixing tanks configured to combine nutrients in water to generate one or more nutrient solutions;
a hydraulic delivery system configured to release a mist of the one or more nutrient solutions, the hydraulic delivery system comprising:
sensors hydraulically coupled to the one or more mixing tank;
a high pressure pump hydraulically coupled to the one or more mixing tank;
multiple flow control valves downstream of the high pressure pump; and
micro-sprayers hydraulically coupled to the one or more mixing tank and positioned to direct the mist of the one or more nutrient solutions towards the plants disposed within the growth frames,
wherein the hydraulic delivery system is configured to pulse a release of the mist of the one or more nutrient solutions during a feeding cycle according to one or more patterns of incremental pressure thresholds that are based on a desired droplet size of the mist of the one or more nutrient solutions; and
a processor configured to execute instructions to:
receive pressure conditions from the sensors;
set a high pressure threshold at 1000 pounds per square inch and a lower pressure threshold at 540 pounds per square inch; and
control the pulses of the release of the mist of the one or more nutrient solutions to decrease the pressure conditions within the hydraulic delivery system from the high pressure threshold to the low pressure threshold at intervals of 1000 pounds per square inch to 780 pounds per square inch, 780 pounds per square inch to 620 pounds per square inch, and 620 pounds per square inch to 540 pounds per square inch.

8. A system for pulsed aeroponic plant growth without using a media substrate to support plant roots comprises:
a growth platform having an elevated planar surface and configured to support multiple growth frames, wherein stem and leaf portions of plants extend above the elevated planar surface and root portions of plants extend below the elevated planar surface when the plants are disposed within the growth frames;
one or more mixing tanks configured to combine nutrients in water to generate one or more nutrient solutions;
a hydraulic delivery system configured to release a mist of the one or more nutrient solutions, the hydraulic delivery system comprising:
sensors hydraulically coupled to the one or more mixing tank;
a high pressure pump hydraulically coupled to the one or more mixing tank;
multiple flow control valves downstream of the high pressure pump; and
micro-sprayers hydraulically coupled to the one or more mixing tank and positioned to direct the mist of the one or more nutrient solutions towards the plants disposed within the growth frames,
wherein the hydraulic delivery system is configured to pulse a release of the mist of the one or more nutrient solutions during a feeding cycle according to one or more patterns of incremental pressure thresholds that are based on a desired droplet size of the mist of the one or more nutrient solutions; and
a processor configured to execute instructions to:
receive pressure conditions from the sensors;

set a high pressure threshold at 1000 pounds per square inch and a lower pressure threshold at 540 pounds per square inch; and control the pulses of the release of the mist of the one or more nutrient solutions to increase the pressure conditions within the hydraulic delivery system from the low pressure threshold to the high pressure threshold at intervals of 540 pounds per square inch to 660 pounds per square inch, 660 pounds per square inch to 790 pounds per square inch, 790 pounds per square inch to 840 pounds per square inch, and 840 pounds per square inch to 1000 pounds per square inch.

* * * * *